United States Patent
Moreno et al.

(10) Patent No.: US 10,592,504 B2
(45) Date of Patent: *Mar. 17, 2020

(54) SYSTEM AND METHOD FOR QUERYING QUESTIONS AND ANSWERS

(71) Applicant: Taiger Spain SL, Madrid (ES)

(72) Inventors: Carlos Ruiz Moreno, Madrid (ES); Sinuhé Arroyo, Madrid (ES)

(73) Assignee: CAPRICORN HOLDINGS PTE, LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,510

(22) Filed: Oct. 11, 2018

(65) Prior Publication Data
US 2019/0042572 A1    Feb. 7, 2019

Related U.S. Application Data

(63) Continuation of application No. 15/018,338, filed on Feb. 8, 2016, now Pat. No. 10,127,274.

(51) Int. Cl.
*G06F 7/00* (2006.01)
*G06F 17/30* (2006.01)
*G06F 16/2452* (2019.01)
*G06F 16/332* (2019.01)

(52) U.S. Cl.
CPC .... *G06F 16/24522* (2019.01); *G06F 16/3329* (2019.01); *H05K 999/99* (2013.01)

(58) Field of Classification Search
None
See application file for complete search history.

(56) References Cited

U.S. PATENT DOCUMENTS

| | | | |
|---|---|---|---|
| 2008/0221892 A1* | 9/2008 | Nathan | G06F 17/279 704/257 |
| 2009/0248666 A1* | 10/2009 | Ahluwalia | G06F 16/951 |
| 2011/0047178 A1* | 2/2011 | Song | G06F 16/334 707/769 |
| 2012/0303356 A1* | 11/2012 | Boyle | G06F 17/2785 704/9 |
| 2013/0007033 A1* | 1/2013 | Brown | G06F 17/28 707/764 |
| 2014/0006012 A1* | 1/2014 | Zhou | G06F 16/3329 704/9 |
| 2015/0169544 A1* | 6/2015 | Bufe, III | G06N 5/02 704/9 |

* cited by examiner

*Primary Examiner* — Tuan A Pham
(74) *Attorney, Agent, or Firm* — Quarles & Brady LLP (57) ABSTRACT

A system and method for information retrieval are presented. A client computer receives a natural language query comprising an array of tokens. A query processing server analyzes the natural language query (interpreted as a question) to identify a plurality of terms and a relationship between one or more pairs of the terms according to a knowledge model defining interrelationships between a plurality of entities. A set of assertions is constructed using the relationship between the pair of terms, and a query is executed against a knowledge base of frequently asked questions, corresponding answers, documents and/or data using the set of assertions to generate a set of results. The knowledge base identifies a plurality of items, each of the plurality of items is associated with at least one annotation identifying at least one of the entities in the knowledge model. The set of results are transmitted to the client computer.

18 Claims, 4 Drawing Sheets

FAQ Search Control Panel

User Query: [                    ] [Search]

Triples: [                    ] [Edit]

Results (complete matches)

<This is a first question that matches> +
    <This is a second question that matches> +
    <This is a third question that matches> -
        <And a corresponding answer in expanded form>

Results (partial matches)

<This is a first question that matches partially> +

SYSTEM AND METHOD FOR QUERYING QUESTIONS AND ANSWERS

FIELD OF THE INVENTION

The disclosure relates in general to an electronic system for querying a database and, more particularly, to a method and apparatus for enabling a user to query a database of frequently asked questions and corresponding answers using a natural language query.

BACKGROUND

In conventional information retrieval systems, most users follow a well-known pattern: There is an initial query, either expressed in natural language, keywords, database query, etc. This query is used to search a database or other knowledge base repositories for a wide range of results.

Different approaches have been taken with respect to information retrieval and search techniques within large database repositories. Typically, the process of information retrieval is triggered by a query entered by a user. In many scenarios it is easier and more convenient for human users to provide and type (or speak) a sentence in natural language than to use a formal syntax like a formal query language referring to concepts in an ontology when searching for content or asking a question. Learning a formal syntax takes effort and practice and if that initial hurdle can be removed then the content of a knowledge base becomes accessible a lot easier. Queries, in this context, formally capture the user's information needs, and are aimed at retrieving a set of results that match the query, ordered by relevancy. In most cases, the user input is a string of natural language text, enabling the execution of keyword queries of a database to retrieve a listing of items from the database that are indexed with the same keywords in the repository.

Two important information retrieval systems performance measures are "precision" and "recall". Given a particular query, a set of items in the repository, and an a priori knowledge of document relevancy so that each item is known to be either relevant or non-relevant for a given query, "precision" measures the ratio between the number of relevant items included in the set of query results and the total number of the set of results, while "recall" measures the ratio between the number of relevant items in the set of results and the total number of relevant items in the repository.

Generally, there is a trade-off between recall and precision, so that if precision is increased, recall will be poor, and in turn, if recall is increased, precision will be poor. For keyword-based systems, many systems do not reach 40% for both measures, given that ambiguous words in the query of a queried database might produce erroneous results and that different ways of referring to the items in the database might cause relevant documents not to appear in the results.

Ontology-powered approaches and semantic technologies have enabled more precise results, for they enable a better "understanding" of the user needs. The filtering and selection of results is particularly relevant in systems with a high volume of information in which users retrieve too many results, making the relevant documents not easily accessible.

BRIEF SUMMARY

The disclosure relates in general to an electronic system for querying a database and, more particularly, to a method and apparatus for enabling a user to query, using a natural language query, a database of frequently asked questions (FAQs) and/or their corresponding answers, and generate results of the query executed against the database.

In one implementation, the present invention is an information retrieval system comprising a knowledge model database configured to store a knowledge model for a knowledge domain. The knowledge model defines a plurality of entities and interrelationships between one or more of the plurality of entities. The plurality of entities includes concepts and instances. The system includes a knowledge base identifying a plurality of FAQs, corresponding answers, documents and/or data items. Each of the plurality of FAQs, corresponding answers, documents and/or data items, is associated with one or more annotations identifying at least one of the entities in the knowledge model. The system includes a query processing server configured to receive an array of tokens from a client computer using the computer network. In some embodiments, this array of tokens may be interpreted as a natural language query, identify the natural language query as a question, analyze the natural language query to identify a plurality of terms, and determine a relationship between one or more pairs of terms in the plurality of terms using the knowledge model. The query processing server is configured to construct one or more sets of assertions (e.g., concepts, instances, relationships and/or triple statements) using one or more pairs of terms and relationships, all connected to a statement consisting of several triples, execute a query against the FAQs, corresponding answers, documents and/or data items in the knowledge base using the natural language query and/or set of assertions to generate a set of results, and transmit, to the client computer, the set of results. The set of results identifies a set of FAQs, corresponding answers, documents, and/or data items in the knowledge base. Thus, the information retrieval system includes a query processing server configured to query the knowledge base using the question/statement to generate a result listing identifying an item in the knowledge base.

In another implementation, the present invention is a method for information retrieval comprising the steps of: receiving a natural language query from a client computer using a computer network; analyzing the natural language query to identify a plurality of terms and interpret the natural language query as a question; determining a relationship between a pair of terms in the plurality of terms using a knowledge model, the knowledge model defining a plurality of entities and interrelationships between one or more of the plurality of entities for a knowledge domain; constructing a triple statement using the relationship between the pair of terms; executing a query against a knowledge base using the triple statement to generate a set of results listing at least one question and at least one answer, the knowledge base identifying a plurality of items including the at least one question and the at least one answer to the at least one question, each of the plurality of items being associated with at least one annotation identifying at least one of the entities in the knowledge model; and transmitting, to the client computer, the set of results.

In another implementation, the present invention is a non-transitory computer-readable medium containing instructions that, when executed by a processor, cause the processor to perform the steps of: receiving a natural language query from a client computer using a computer network; analyzing the natural language query to identify a plurality of terms and interpret the natural language query as a question; determining a relationship between a pair of terms in the plurality of terms using a knowledge model, the knowledge model defining a plurality of entities and interrelationships between one or more of the plurality of entities for a knowledge domain; constructing a triple statement using the relationship between the pair of terms; executing a query against a knowledge base using the triple statement to generate a set of results listing at least one question and at least one answer, the knowledge base identifying a plurality of items including the at least one question and the at least one answer to the at least one question, each of the plurality of items being associated with at least one annotation identifying at least one of the entities in the knowledge model; and transmitting, to the client computer, the set of results.

DETAILED DESCRIPTION OF THE DRAWINGS

The disclosure relates in general to an electronic system for querying a database and, more particularly, to a method and apparatus for enabling a user to query a database using a natural language question query and enabling a user to retrieve results of a query executed against a database comprising FAQs and/or their corresponding answers.

This invention is described in embodiments in the following description with reference to the Figures, in which like numbers represent the same or similar elements. Reference throughout this specification to "one embodiment," "an embodiment," "one implementation," "an implementation," or similar language means that a particular feature, structure, or characteristic described in connection with the embodiment is included in at least one embodiment of the present invention. Thus, appearances of the phrases "in one implementation," "in an implementation," and similar language throughout this specification may, but do not necessarily, all refer to the same embodiment.

The described features, structures, or characteristics of the invention may be combined in any suitable manner in one or more implementations. In the following description, numerous specific details are recited to provide a thorough understanding of implementations of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Any schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present system and method enable a user to provide a query input that consists of an array of tokens, possibly comprising a natural language query, which the disclosed system may be configured to identify as a question. The question from the natural language query is then transformed into a structured query configured to be executed against and extract the desired results from a knowledge base, specifically targeting, in some embodiments, a section of the knowledge base consisting of FAQs and answers to the FAQ questions. The system and method generally extracts relevant (or potentially relevant) terms from the natural language query using Named Entity Recognition (NER—also referred to as "entity identification" or "entity extraction") and Relationship Extraction techniques. Once the terms have been extracted, the terms are combined into triples, used to generate a set of assertions that follow the ontological schema of a knowledge model. The set of assertions can then be used to query and/or search the knowledge base for the FAQs, corresponding answers to the questions, documents and/or data items, any or all of which are further annotated with a matching set of assertions, such as concepts, instances, relationships and/or triples, as disclosed herein. Thus, in some disclosed embodiments, finding answers to FAQs corresponding to the user's natural language query is very accurate because the user input, which is interpreted as a question, can be directly compared to the FAQs in the knowledge base, and the corresponding answer can be presented to the user that entered the user query.

Figure 1:
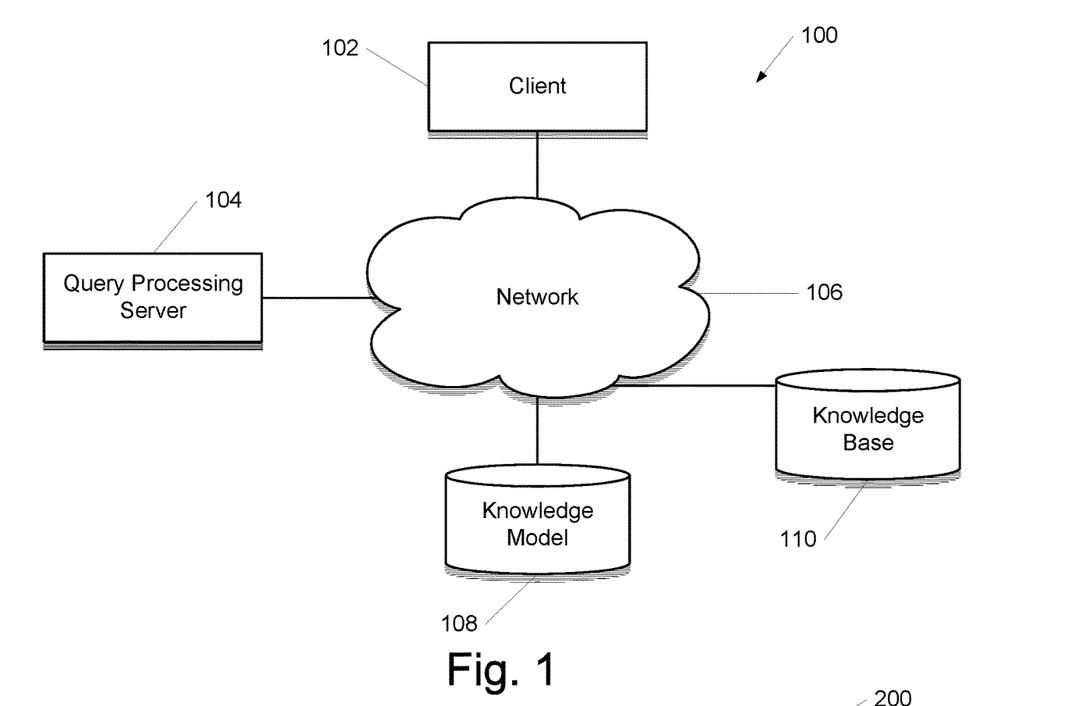
FIG. 1 is a block diagram illustrating one example configuration of the functional components of the present information retrieval system.

FIG. 1 is a block diagram illustrating one example configuration of the functional components of the present information retrieval system 100. System 100 includes client 102. Client 102 includes a computer executing software configured to interact with query generation and processing server 104 via communications network 106. Client 102 can include a conventional desktop computer or portable devices, such as laptops computers, smart phones, tablets, and the like. A user uses client 102 to submit a query (e.g., a natural language query, possibly in the form of a question) and then view the results of that query after execution of the query against a particular knowledge base comprising FAQs and their corresponding answers.

Query generation and processing server 104 is configured to interact with client 102 to perform a query. In one implementation, the query is a natural language query interpreted to be a question, where a user supplies the natural language query terms using client 102. Query processing server 104 receives the natural language query, performs NER and relationship extraction on the natural language query to identify terms associated with the query that appear in a relevant knowledge model and interprets the natural language query as a question. Query processing server 104 then uses the terms identified within the question from the natural language query in combination with the knowledge model to construct structured queries of the database made up of the FAQs and answers within the knowledge base. The structured queries are used to query a knowledge base of FAQs and their corresponding answers to generate a listing of items in the knowledge base that satisfy the query requirements and further comprise an answer to the question posed in the natural language query.

This implementation should not limit the scope of the disclosed invention. In some implementations, the query performed through the interaction of the client 102 and the query generation and processing server 104 may comprise the query being received as a natural language query interpreted as a question which is answered by the answer to an FAQ stored in the knowledge base. In some implementations, however, the array of tokens within the query may be interpreted as a structured query to search non-FAQ items or any other assets within the knowledge base, or any combination of both FAQ and non-FAQ assets within the knowledge base.

In some embodiments, rather than using data in the question form, alternative means to interpret the natural language input as a question may include natural language and/or grammar analysis. This natural language or grammar analysis may automatically determine if the user input is to be interpreted as a question. For example, the query generation and processing server 104 may apply several techniques of Natural Language Processing (NLP), including simple and more complex heuristics, to determine if the query is a question or not. The simple heuristics may include identification of "W-words" (e.g., what, where, when, why) or question marks within the array of tokens to interpret it as a question. More complex heuristics may be based on the input language such as sentence detection with structured-based regular expressions and part-of-speech tagging. There may be some differences in terms of how NLP is applied and how the entities are weighted for search. In one example embodiment, if it is determined that the user query is not a question, the system may be configured to only use the terms to search.

To perform these tasks, query generation and processing server 104 accesses knowledge model database 108, which contains the knowledge model (i.e., the concepts, instances and relationships that define the subject matter domain). Once a query has been created based on the question from the natural language query, or from the array of tokens interpreted as a structured query search, query generation and processing server 104 is configured to interact with client 102 to perform a query, and query generation and processing server 104 executes the query against the FAQs, corresponding answers, documents and/or data items within a database portion of the knowledge base 110, which stores the knowledge base and any metadata or annotations describing the FAQs, corresponding answers, documents and/or data items of the knowledge base. In knowledge base database 110, the items to be retrieved are generally annotated with one or more of the terms available in the knowledge model.

Thus, knowledge base database 110 may comprise a content comprising FAQs, corresponding answers, documents or data items. All of the content of this knowledge base database 110 (FAQs and non-FAQs items such as a document) needs to be previously analyzed and annotated for use by the system. Depending on the level of precision desired, the documents within the knowledge base database 110 may be annotated by concepts, instances, relationships and triples, each of which are explained in greater detail below.

For example, if the knowledge base database 110 comprises a document, doc1, this document may be annotated in the knowledge base according to concepts, instances, relationships and triples. For concepts, the annotation for doc1 may include a sort of simplified triple, such as: doc1: isAnnotated :Football; or doc1 :isAnnotated :Goal. For instances, the annotation for doc1 may include a sort of simplified triple, such as: doc1 :isAnnotated:Cristiano_Ronaldo. For relationships, the annotation for doc1 may include a sort of simplified triple, such as: doc1 :isExplainedIn :FAQ1; for triples, the annotation for doc1 may include: :Cristiano_Ronaldo :scores :goal. This triple may cover a video in which Cristiano_Ronaldo scores a goal. Additional implicit annotations may include simple implicit annotations, such as :FootballPlayer, or more complex annotations such as :FootballGoal, :Real_Madrid, or :La_Liga. These annotations may be fully open using manual annotations, but because of their tricky nature (e.g., if Cristiano Ronaldo is playing for a national team), may be limited for automatic annotations in a real scenario.

As described in more detail below, Knowledge Model 108 is a data repository, possibly a database, configured to store all ontological components and elements that define the subject matter or knowledge domain. These components and elements include the concepts, instances and relationships between them, and may be stored as database records within the knowledge base. As described in detail below, concepts may include the classes of abstract objects of a given domain, such as categories or types; instances may include individual concrete objects; and relationships may specify how objects in the knowledge model relate to the other objects.

As described in more detail below, Knowledge Base 110 is a data repository, possibly a database, configured to store digital information for retrieval, possibly as data records. This information may include electronic documents such as the disclosed FAQ questions and answers, documents, spreadsheets, email, multimedia data, etc. that the user may wish to search. Each of the data items in the knowledge base 110 may be associated with different terms, concepts or entities from the knowledge base 108, as described herein.

As used in the present disclosure, NER is a form of Information Extraction (IE) that aims at locating, within unstructured text, atomic elements that belong to a predefined set of categories, such as the names of persons, organizations, locations, etc. For example, in a cinema knowledge domain, if NER is performed on a question sentence such as "Does Christian Bale star as DC Comics' Batman in The Dark Knight Rises, directed by Christopher Nolan?" at least the named entities for "Christian Bale," "Batman," "The Dark Knight Rises," and "Christopher Nolan" would be identified.

Approaches for NER include the use of linguistic grammar-based techniques and statistical models. In the present disclosure, however, NER is dependent on the underlying ontology knowledge model (in this case relating to the cinema). As such, the example named terms identified in the sentence would be identified as a result of their being included in the relevant knowledge model. In this example, the knowledge model would include the synonym "DC" for "Detective Comics," in order for the NER process to identify the correct term, for in that particular case, even though the name is different, because of the use of synonyms in the knowledge model, the entity "DC" could be properly identified. In some cases, different terms might be recognized for a string of text, possibly terms or sentence structure indicating that the natural language query is a question (e.g., what, where, when, why, how, etc.); in these cases, syntactic analysis of the string, and in particular part-of-speech (POS) tagging, can help disambiguate the terms and properly identify the relevant one.

Relationship Extraction is another subtask of IE, similar to NER, but where the objective is not to locate and classify the terms within unstructured text, but the semantic relationships among them. In this case, it is mostly the verbs, which are able to relate nouns, that is the part of the sentence identified by the technique. For example, in the question sentence "Did Christopher Nolan direct The Dark Knight Rises?" the relationship "direct" would be identified by this task. Note that in this case, through lemmatization techniques, i.e., by grouping together the different inflected forms of a word (e.g., "directing", "directs", "directed") so they are considered as a single term, it is also possible to identify the relationships even in different tense form.

Accordingly, NER is a technique that can be used to identify terms in a natural language question that may be instances or concepts within the knowledge model. Similarly, relationship extraction is a technique that can be used to identify terms in a natural language query that may be relationships within the knowledge model.

The present system and method provides a mechanism in which users can construct a formal query composed of statements that comply with an underlying structured knowledge model. In one implementation, the statements define a structured relationship between entities that may be associated with one or more documents in a knowledge base. Such a structured query, including one or more such statements, is able to retrieve a relevant set of results from a document repository (e.g., a knowledge base) in which each document has been annotated with the same kind of statements compliant with a knowledge model, as previously referenced, with examples, above.

The present disclosure provides a system and method providing a search algorithm that enables a user to initiate a search using, for example, a natural language query (possibly in the form of a question), sentence or an array of tokens used for a more structured query. One interpretation of the input expression may include interpretation as a question. However, in some embodiments, the natural language query may be interpreted as a formal query statement, such as a database query language and syntax, as previously described. After the search has been executed, search results may be displayed to the user via client 102. These search results may include a listing of answers to the question indentified in the query, which were powered by an underlying ontology model.

In embodiments that interpret the array of tokens as a natural language query, the natural language query may be entered via a user input interface displayed on the client 102. In embodiments where the user interface includes a specific user input, such as a question input field in a question form displayed on the client 102, the system may be configured to interpret the natural language input as a question, as previously described. For example, in addition to transmitting the content of the question input field, the question input field or question input form may also be configured to transmit additional data identifying the natural language input as a question.

In some embodiments, the question form may comprise additional input fields (e.g., checkboxes), allowing a user to select limitations on the data items to be searched within the knowledge base (e.g., FAQs, documents, spreadsheets, email, etc.). In these embodiments, if the search is limited to data items containing FAQs, then the interpretation of the natural language input as a question can be assumed. The interpretation of the natural language expression as a question will reduce the set of documents or data items eligible for search to those that represent the FAQs.

In embodiments that interpret the natural language input as a question (using any of the disclosed means or those otherwise known in the art), a general search of the knowledge base would not be appropriate, since the returned results for searches interpreted as a question should only include data items within the knowledge base that contain an answer to the question asked in the natural language query. In other words, the documents that match the concepts and relationships from the natural language query, but do not provide an answer to the question, should not be returned to the user as part of the result.

In some embodiments that do not interpret the natural language query as a question, the expression within the natural language query may be interpreted as a search expression (e.g., a database query). In these embodiments, the search elements, as well as the returned documents, may contain the searched-for predicates. In these instances, a general search of the knowledge base, which may search for all structured and unstructured data items in a knowledge base that correspond to the natural language query, may be appropriate.

For a given subject matter, the present system provides and uses two well-differentiated data repositories: the knowledge model and the knowledge base. A knowledge model may define the relationships between a number of terms that may be present in the annotations or metadata associated with different items in the knowledge base. In that case, the knowledge model contains a schema of abstract concepts and their relationships. In the case of a knowledge model for the basketball domain, for example, the knowledge model may define concepts such as "basketball player" and "team" and their connection through the "plays for" relationship. Optionally, the knowledge model may also contain concrete instances with their respective general assertions in the domain, such as concrete basketball player like "Pau Gasol" or teams like "Los Angeles Lakers", and the relationships amongst them.

The knowledge model includes an ontology that defines concepts, entities, and interrelationships thereof for a given subject matter or knowledge domain. The knowledge model repository (stored, for example, in knowledge model database 108) contains the relationships amongst the different types of entities in the knowledge domain. The knowledge model identifies both the "schema" of abstract concepts and their relationships, such as the concepts "actor" and "movie" connected through the "appears in" relationship, as well as concrete instances with their respective general assertions in the domain, such as concrete actors like "Christian Bale" or directors like "Christopher Nolan", and their relationship to the movies they appear on, or have directed, etc. The knowledge model, therefore, normalizes the relevant terminology for a given subject matter domain.

The knowledge model may be composed of different ontological components that define the knowledge domain: The components can include concepts, instances, and relationships. Concepts (classes) are abstract objects of a given domain (in the present disclosure, as seen above, the knowledge domain of "the cinema" or "sports" may be used for a number of non-limiting examples) such as categories or types. Examples of concepts would include "actor," director," or "movie" for the cinema, or "basketball player," "team," or "three-point field goal" for sports.

Instances (individual objects) are concrete objects, for example a given actor such as "Christian Bale" or a movie, like "The Dark Knight Rises" for the cinema, or a given player such as "Pau Gasol" or a team like, "Los Angeles Lakers," for sports. Relationships (relations) specify how objects in the knowledge model relate to other objects, for example the relationship "appears in" or "directs" links the concept "actor" or "director" to "movie" respectively, while "plays for" links the concept "basketball player" with the concept "team." Relationships can also relate instances, such as linking the concrete instance "Christian Bale" with the instance "The Dark Knight Rises" via the relationship "appears in," or the concrete instance "Pau Gasol" with the instance "Los Angeles Lakers." In some cases, two terms may be directly connected through more than one relationship; for example, the concept "basketball player" and the concept "team" may also be related through the "plays against" relationship. Entities refer to both Concepts and Instances.

A knowledge model may be constructed by hand, where engineers (referred to as ontology engineers) lay out the model's concepts, instances and relationships and the relationships thereof. The terms of the knowledge model include concepts, instances and relationships of a given domain to be used within a specific application are usually modeled by hand by ontology engineers. Such modeling is a process where application specific decisions need to be taken to relate the terms of the knowledge model, and even though there are standard vocabularies and ontologies, the same domain may be modeled in different ways. However, other knowledge model structures may be utilized through similar models employing a structure that relates entities of an ontology through formal relationships, but with different naming conventions.

In the present disclosure, reference is made to ontologies as a mechanism to describe the relationship between a number of entities, however any other equivalent or similar model, possibly including a graph structure, may be utilized in place of the ontologies of the present disclosure. This modeling is a process where domain-specific decisions need to be taken, and even though there exist standard vocabularies and ontologies, it is worth noting the same domain may be modeled in different ways, and that such knowledge models may evolve over time.

Sometimes the knowledge model is used as a base and the model's individual components are considered static, but the present system may also be implemented in conjunction with dynamic systems where the knowledge model varies over time. Sometimes the semantic model is used as a base and the model's individual components are considered static, but the present system may also be implemented in conjunction with dynamic systems where the knowledge model varies over time.

One possible implementation of the knowledge model, considering the particular example of semantic (ontological) systems could be a "triplestore"—a repository (database) purpose-built for the storage and retrieval of semantic data in the form of "triples" (or "statements" or "assertions"). The concept of "triple" in this sense is to be understood in a broad sense as a data entity that follows a subject-predicate-object (s,p,o) pattern (e.g., subject→predicate→object). An example of such a triple is ("Christian Bale", "appears in", "The Dark Knight Rises"). Generally, subject and object of a triple store include concepts or instances from the knowledge model, while the predicate is a relationship from the knowledge model, although similar data models may be used. As a possibility in this respect, a semantic data model widely extended for expressing these statements is the Resource Description Framework (RDF). Query languages like SPARQL are one possibility for retrieving and manipulating RDF data stored in triplestores, although other mechanisms are also possible. The RDF Schema (RDFS) is a non-limiting example of a set of classes with certain properties using the RDF extensible knowledge representation data model, providing basic elements for the description of ontologies, otherwise called RDF vocabularies, intended to structure RDF resources. These resources can be saved in a triplestore to reach them with the query language SPARQL.

Triplestores are well known types of databases and are routinely implemented to manage knowledge models. Generally, the subject and object of a triplestore can include concepts or instances selected from the relevant knowledge model, while the predicate is a relationship also selected from the relevant knowledge model, although other similar data models may be used. An example triple constructed from two concepts and a valid relationship in the cinema domain would be ("actor", "appears in", "movie").

The knowledge model thus contains the relationships amongst the different types of resources in the application domain. The knowledge model contains both the (ontological) schema of abstract concepts and their relations such as ("actor", "appears in", "movie"), as well as instances with their respective general "static" assertions valid for the whole domain, such as concrete "actors" like "Christian Bale," "Michael Cane," or "Joseph Gordon-Levitt" or directors like "Christopher Nolan" and their relationship to the movies they appear in, have directed, etc. These concrete instances are used for the NER and relationship extraction, described above. As explained above, the ontology-engineering task by which the model is configured is a manual process, though it might count on semi-automatic support by previously identifying the kind of concepts and instances that will be relevant for the domain.

It is worth noting that the triplestore arrangement is just a possible implementation of a knowledge model, in the case that a semantic model is used. However, other types of repositories able to define the entities and relationships of the knowledge model (e.g., other formalisms, such as semantic nets or query languages) may also be used as valid representations.

As an example of a particular scenario of triple-based statements, the abstract concept-relationship-concept (C,r,C) statement like ("actor", "appears in", "movie") could be stored in the knowledge model as a triple statement, along with specific instances in the domain such as "Christian Bale" (and the instance's association to the "actor" concept) or "The Dark Knight Rises" (which belongs to the "movie" concept), and their respective relationships for the whole domain. In other implementations of the knowledge model, other types of repositories, instead of triplestore-based knowledge models, are also able to contain and define the entities and relationships of the knowledge model. One approach that is proposed here is to analyze the natural language input/question, extract key concepts/relations and represent the natural language input in terms of the knowledge model of the knowledge base via triples, as described below.

The knowledge base, in contrast to the knowledge model, is the store of information that the information retrieval system is configured to search. The knowledge base is a database including many items (or references to many items) where the items can include many different types of content (e.g., FAQ questions and answers, documents, spreadsheets, email, multimedia, data, and the like) that a user may wish to search. The content of the knowledge base can be stored in any suitable database configured to store the contents of the items and enable retrieval of the same. To facilitate searching, the items in the knowledge base, such as the disclosed FAQs and their corresponding answers, can each be associated with different terms, concepts and/or entities (e.g., instances, and/or relationships) contained within the knowledge base. This association can be made explicitly (e.g., through the use of metadata associated with the content), or implicitly by the item's contents.

With the items in the knowledge base catalogued using information described in the knowledge model, the knowledge model becomes an index or table of contents by which to navigate the contents of the knowledge base.

The knowledge base is the repository that contains the items or content that the user wishes to search and retrieve, which, in the present invention, comprise a collection of FAQs and their corresponding answers. In addition to the disclosed FAQs and answers, however, the knowledge base may store many items including many different types of digital data. The knowledge base, for example, may store plain text documents, marked up text, multimedia, such as video, images and audio, programs or executable files, raw data files, etc. The data items can be annotated with both particular instances (e.g., "Christian Bale") and concrete assertions ("Christian Bale," "appears in," "The Dark Knight Rises") selected from the knowledge model, which are particularly relevant for the given item.

One possible implementation of the knowledge base is a Document Management System that permits the retrieval of documents via an index of the entities of the knowledge base, or an FAQ answer retrieval system that identifies, retrieves and presents answers to user queries submitted as natural language questions via an index of questions (and corresponding answers) stored and identified in the knowledge base. To that end, questions, answers and/or other documents in the repository need to be associated to (or "annotated with") those entities. The items can be annotated with both abstract concepts (e.g., "actor") and particular instances (e.g., "Christian Bale") selected from the knowledge model, which are particularly relevant for the given item. In the context of the current invention, the content of the knowledge base may store structured (e.g., specific data records for FAQs and answers being associated in the database), as well as unstructured (e.g., documents, spreadsheets, emails, multimedia, etc.) data.

Structured data, such as FAQs and their associated answers, may comprise data records within a database portion of the knowledge base. Each of the FAQs and their associated answers may be stored in association with a specific FAQ concept in the knowledge model, according to the associated and annotated triples disclosed herein. Each FAQ may likewise be associated with its corresponding answer and vice versa. In some embodiments, multiple FAQ/answer couplings may be associated with the same concepts, instances, relationships or triples, meaning that multiple results may be returned in response to a single natural language user query.

Any means now known or later discovered of populating a data or knowledge base may be used to enter the FAQs and corresponding answers and/or other knowledge base data into the knowledge base. For example, the questions and answers may be manually entered into the knowledge base by an administrator. The administrator may also identify one or more previously available databases comprising FAQs and their corresponding answers, and may set the locations of the FAQ databases, mapping the correct questions and answers accordingly. Such an approach would save the administrator the trouble of manually typing in each of the FAQs and answers. These FAQs and answers, or the location of the FAQ databases, may be added, updated, deleted, or otherwise changed at any time through a manual or automatic database update.

In the context of the current invention, FAQs and their corresponding answers, or other electronic documents, may be annotated with concepts and/or relationships given by the ontologies known to the system at the time the FAQs or other documents are made known to the system or are changed within the system.

For each annotation in the knowledge base, both concepts (e.g., "actor") and particular instances (e.g., "Christian Bale") from the knowledge model may have been used to build the annotation statement. If the underlying knowledge model is a semantic model, the statements can take form as triple-based (s,p,o) assertions.

In the case that the knowledge model is a semantic model and is constructed using triple statements, there may be four possible combinations for the triple-based statements that can be used to annotate the items in the knowledge base: (C,r,C), (C,r,I), (I,r,C) and (I,r,I), where 'C' stands for "Concept", 'I' stands for "Instance" and 'r' stands for "relationship". As such, a particular item in the knowledge base may be annotated with, respectively, abstract statements that include concepts and no instances (e.g., ("actor", "appears in", "movie")), more precise statements where one of the concepts is replaced with an instance (e.g., ("actor", "appears in", "The Dark Knight Rises") or ("Christian Bale", "appears in", "movie")), or statements that include no concepts and only instances and relationships (e.g., ("Christian Bale", "appears in", "The Dark Knight Rises")). Again, in other implementations, these types of statements may be modified if the underlying knowledge model is not based on triples.

With respect to the association of sets of assertion statements to questions and answers, or other documents, in the knowledge base (i.e., annotation), different approaches can be utilized. In particular, the process of annotation can be performed both manually, with users associating particular assertion statements to the knowledge base item, and automatically, by detecting which references to concepts, instances, entities, and/or relationships appear in each item in the knowledge base, and matching them to triple-based assertion statements from the knowledge model. The documents in the knowledge base are then indexed according to the structured statements that appear in or have been associated to them.

The techniques described herein can be applied to repositories of FAQs/answers or other documents in which annotations have been performed through different manners. The process of annotation for the FAQs/answers or other documents may have been performed both manually, with users associating particular concepts, instances, entities, relationships and/or triples in the FAQs or answers (or other documents) to particular concepts, instances, entities, relationships and/or triples in the knowledge model, and/or automatically, by detecting which references to concepts, instances, entities, relationships and/or triples appear in each knowledge base item. Systems may provide support for manual annotations by facilitating the user finding and selecting concepts, instances, entities, relationships and/or triples from the knowledge model, so these can be associated to items in the knowledge base. For example, in a possible embodiment, the system may offer auto-complete functionality so when the user begins writing a portion of a word, the system might suggest a potential completion for the word.

The user may decide then to annotate a given item with the chosen instance, i.e., to specify that the concept, instance, entity, relationship and/or triple from the knowledge model is associated to the particular item in the knowledge base. For example, in a possible embodiment, the system may offer auto-complete functionality so when the user begins writing "Gordon-", the system might suggest "Gordon-Levitt" as a particular instance that the user could choose.

When automatically creating metadata for the knowledge base items, techniques like text parsing and speech-to-text over the audio track or a multimedia item can be used along with image processing for videos. In this manner, it is possible to associate each of the items in the knowledge base (or even portions of the items), with the entities (e.g., concepts, instances, and relationships) that are present in the knowledge model. This process is dependent on the knowledge model because the identification of entities in the knowledge base item is performed in reliance upon the knowledge model. For example, the visual output of certain documents (e.g., images or video) can be analyzed using optical character recognition techniques to identify words or phrases that appear to be particularly relevant to the document. These words or phrases may be those that appear often or certain words or phrases that may appear in a corresponding knowledge base. For example, when operating in the cinema knowledge domain, when a document includes words or phrases that match particular concepts, instances, relationships, or entities within the knowledge domain (e.g., the document includes the words "actor", "Christian Bale", and "Joseph Gordon-Levitt") the document can be annotated using those terms as they relate to either concepts, instances, or relationships in the knowledge model. For documents containing audio, the audio output can be analyzed using speech to text recognition techniques to identify words or phrases that appear to be particularly relevant to the document. These words or phrases may be those that are articulated often or certain words or phrases that may appear in a corresponding knowledge base. For example, when operating in the sports knowledge domain, when a document includes people discussing particular concepts, instances, relationships, or entities within the knowledge domain the document can be annotated using those terms.

Additionally, a combination of approaches (semi-automatic techniques) is also possible for annotating the knowledge base. The result of such annotation techniques is that the items/documents in the knowledge base repository are then indexed with metadata according to the entities (knowledge model concepts and/or instances) that appear in or have been associated to the items.

In the case of manual annotation, terms that belong to the knowledge model are associated with the items in the knowledge base. Different techniques for encouraging users to participate in the manual annotation of content may be applied, like the use of Games with a Purpose to leverage the user's interactions while they play. Again, the underlying knowledge model and the model's design define the kinds of annotations that can be applied to the items in the knowledge base.

In the context of the present invention, a search of the annotated data items in the knowledge base may be performed based on an analysis of the natural language query and a search for all data items (such as FAQs and their answers) that match the triples extracted from the natural language query/question. The FAQs and answers found within the knowledge base may include those annotated that match the extracted triples from the natural language query.

The natural language query for the disclosed invention may be analyzed via the appropriate input and represented and described as one or more triples, which completely represent the meaning of the natural language sentence. In some embodiments, the match may include a Boolean connection for multiple triples extracted from the natural language query.

For example, if the natural language input includes the question "Why is there a dog wearing a headset while talking into a microphone?," the disclosed system could transform the natural language query into ("dog" "wearing" "headset") AND ("dog" "talking" "microphone"). The concepts "dog", "wearing", "headset", "talking", "microphone" may or may not exist in the knowledge model that is related to the knowledge base. Where the data records associated with FAQs and answers do exist within the knowledge base, matching questions and answers may also be annotated, as described herein, with the triples ("dog" "wearing" "headset") AND ("dog" "talking" "microphone"). In the above example, all data items that contain a dog wearing a headset as well as talking into a microphone would be included in the result.

In the present invention, the search of the knowledge base may be initiated as a user types the natural language search question into the appropriate question input field within a question form displayed on a client. The query processing server may then interpret the natural language query as a question (based on data from the question input field) and convert the user's search text into one or more triples referring to concepts and relationships from the ontologies known to the system.

The query processing server may attempt to find and match the triples extracted from the natural language query with the triples within annotations for the FAQs and answers (and in some embodiments, all data items) in the FAQ database and/or knowledge base generally. To accomplish this, a triple-based search and answer construction may be used to extract one or more triples from the natural language query sentence (or multiple query sentences) and determine if the natural language query represents a question. If so, the triples extracted from the natural language query may be matched with associated FAQs (or in some embodiments, all data items) annotated in the knowledge base with matching triples. The system may then sub-select those data items that represent an answer to the question (or other data items, which may also be annotated with these triples). As described below, the result of this matching attempt may include complete or partial matching. The results of the complete or partial match may include each answer corresponding to each of the questions in the knowledge base that also match the question interpreted from the natural language query. This match may be determined based on extracted triples.

In some embodiments, the triples identified and extracted from the natural language query may be compared separately with the FAQs and answers stored in the knowledge base. To accomplish this, the data record (or other data item) in the knowledge base for the FAQ question may include an annotation including a set of assertions for that FAQ. In situations where the user is seeking the closest possible FAQ question to the natural language query (in order to find the most closely related answer), the set of assertions associated with the question may be of more interest to the user than the set of assertions in the answer.

The FAQ's associated answer in the knowledge base may likewise include the annotations, including the one or more annotations (possibly including concepts, instances, relationships and triple statements), but independent of the triple statement in the annotation for the FAQ question. The answer within the FAQ database (which tends to be larger than its associated question) includes the independent triple statement because the answers within the FAQ database may comprise new synonyms and entities that are related to the natural language query, but not explicitly included within it. The answers that match the natural language query may nonetheless be of interest as results, independent of the questions that may or may not match the natural language query, within a result set. For any FAQ the disclosed system may include annotations of concepts, instances, relationships, and triples. This also means that the system may include annotations for the questions (plus other linguistic annotations about the type of question, for example) plus annotations for the body of the FAQ.

Depending on whether the question or the answer is of greater interest, the results returned when matching the natural language query with the FAQs or answers in the knowledge base may be weighted accordingly. The triple statements in the question or the answer that match the triple statements in the natural language query may be weighted accordingly, possibly by a system administrator or the user, to place more emphasis on either the question or the answer.

This approach for the matching process may include an equation to determine a final matching score for each of the results in the result set wherein the User Query (UQ) is matched with Questions (Q) and Answers (A) as two different processes but combined in a single vector, setting weights for each dimension as follows: matching (UQ)=matching (UQ, Q1)*questionWeight+matching (UQ, A1)*answerWeight.

As a non-limiting example, Q1 or A1 may be weighted in this equation with a value at or close to 1 (indicating a high relevance and therefore a higher score) and the corresponding value much lower than 1 (indicating a low relevance), causing the result set to favor questions or answers as desired.

The matching function may also rely on semantic similarity, including how close or distant the entities are in terms of the ontologies and knowledge bases deployed in the system, among the triples in the User Query, Questions, and Answers. Thus, if data items are marked as FAQs in the knowledge base, and if their structure supports the distinction between questions and answers, their interpretation can be based on this distinction. The question portions or data records of an FAQ may be interpreted as a question because it is marked as such in an FAQ data record or metadata in the knowledge base. The same is true for the answer portion of an FAQ data record or metadata: being marked as an answer means it is interpreted as an answer. In the same way, the interpretation of a natural language expression as a query is straight forward to accomplish because the user interface provides an input element that is being marked as a question.

The disclosed system, therefore, matches triples extracted from a user's natural language query with the triples stored in annotated FAQs and answers in the knowledge base, and returns the result to the user. As noted above, in some embodiments, the system may find an exact match, a partial match, or no match at all between the triples extracted from the natural language query and the triples annotated in association with the questions and/or answers in the knowledge base.

In instances where an exact match is found, the triples extracted from the user query may comprise a subset of the triples extracted from the annotated FAQs and/or their corresponding answers. In other words, the annotated question or answer for the FAQ may include exactly the same triples as those extracted from the natural language query.

As noted above, in some embodiments, more than one answer may be available for a given question. In these embodiments, the matching formula shown above can be easily extended to also take into account different weights for balancing the relationship between questions and answers. Thus, if the annotated triples for more than one FAQ/answer match the triples extracted from the natural language query, several answers may be available as results. In this case, the system may determine and display to the user that several exact matches are available. The system may then display, possibly as a list, all of the matching answers to the matching question. The order in which the list is displayed may be a function of the degree of subset size, so that an empty subset may be listed first, and the larger the subset, the further down the list the matching FAQ/answer may appear.

In some embodiments, the triples from the natural language query may only partially match the triples from the FAQs/answers in the FAQ database. In other words, the triples extracted from the user query may only partially overlap, as an intersection, with the triples associated with the FAQs and/or answers. In these embodiments, the system may be configured to indicate that there is no exact match, but that partial matches do exist. Where one or more answers are possible in these embodiments, the multiple answers may be listed and/or presented to the user according to the degree of overlap; therefore, the less overlap, the higher an entry would appear in the list. Some embodiments may incorporate a more sophisticated order for the results, comprising a modified version of the TF-IDF (term frequency-inverse document frequency) scoring method dealing with semantic entities, as is known in the art.

Regarding the modified version of the TF-IDF, the traditional TF-IDF has been modified to take into consideration domain knowledge in forms of the domain ontologies. By adding a semantic dimension into the traditional scoring functions, the approach is able to modify the usual list of ranked results and boost those where semantic entities are involved. Simply put, the previous scoring function is modified as follows: For any term in a document or a query, the system tries to identify whether or not it refers to an entity of the domain ontology. Since more than one term might be needed to determine an entity (e.g. Catherine Middleton), a matching algorithm to detect entities with more than one term has been implemented. If the term or the set of terms are identified as an entity of the domain ontology, the system set a boost for that term. It is worth noting that several terms are needed to identify an entity, only the set of terms used to detect the entity is used in the term summation.

In some embodiments, no match may exist between the set of assertions extracted from the natural language query and the annotated set of assertions associated with FAQs and/or answers in the FAQ database. In other words, in these embodiments, no intersections exist between the set of assertions from the user query and FAQ/answers in the knowledge base. In these embodiments, the system may respond in one of the following ways (However, it should be noted that the following are examples only. Additional ways may also exist): the system may present a list comprising all FAQ's/answers as a result (but this list might be too large to be practical); the system may indicate to the user that no match was found, and if the user is known to the system, the system may list past searches by the user; the system may provide an index of terminology as a starting point; or the system may provide the most searched terms in frequency order.

In some embodiments, the system may not be able to convert the text from the natural language query into triples, possibly because of mismatching terminology. In these instances, the system may respond by notifying the user that the user's natural language query cannot be interpreted (i.e., no triple representation can be found). In some embodiments, the system may then provide the user with the most frequently asked questions, the most frequently retrieved FAQ or an index into the FAQ or terminology. If the user is known to the system, it may display successful past searches of the user. The results of these efforts by the system to discern the best responses may be collected for analysis, including analysis of different terminology, expectation, or simply searches which are wrong for the domain of the FAQ. This data may then be evaluated to extend the ontology, or confirm that the user did not use the appropriate terminology.

In the context of a match including a complete/perfect match or a partial match, the disclosed invention may comprise a knowledge model extension based on a triple-based search. This knowledge model extension may determine concepts extracted from the natural language query which are not found in the knowledge model and may keep a history of questions and/or related answers that did not find a match for the FAQs or answers in the knowledge base, or for which only a partial match was found. The natural language expressions that did not match that did not result in answers, and/or were partial matches, may be added to a query history log. This log may be used as a guideline to determine additional FAQs and answers to be added to the database, thereby extending the questions and answers available to the knowledge base.

Statistical analysis may also be performed on partial or non matches, which were collected and stored in the query history log. This statistical analysis may determine, for example, the most frequently searched FAQs for which there is only a partial answer or no answer at all. Additional FAQ questions and answers may be added to the FAQ database according to the most important (i.e., most frequently searched) partial or non answers, thereby creating a more complete and accurate FAQ database.

In many situations, users ask multiple questions, rather than a single question. Thus, some embodiments of the current invention may include a conversation tree. The conversation tree may be used to refine queries in several steps, just as people would in a conversation. This conversation tree module may be configured to determine how the system structures the conversation, by proposing next steps in the conversation. This determination may either be setup manually, or may be learned automatically over time.

For example, the user might ask a question that results in a few partial matches. Based on the conversation tree, some of the partial matches may represent the most likely best next area of refinement of the query for the user. These best next area results may be displayed first in the list of results/answers. Further refinements may require that only those FAQ that are suggested by the conversation tree may be presented, in order to provide more guidance to the user.

The conversation tree may be built manually, or by a learning algorithm that analyzes the triples of the natural language query and the matching FAQ questions and answers, and may learn which question is typically is asked next by users. A heuristic may determine common patterns across users. At some point these patterns may be used to order the FAQ or restrict the display to those based on the heuristic.

Figure 5:
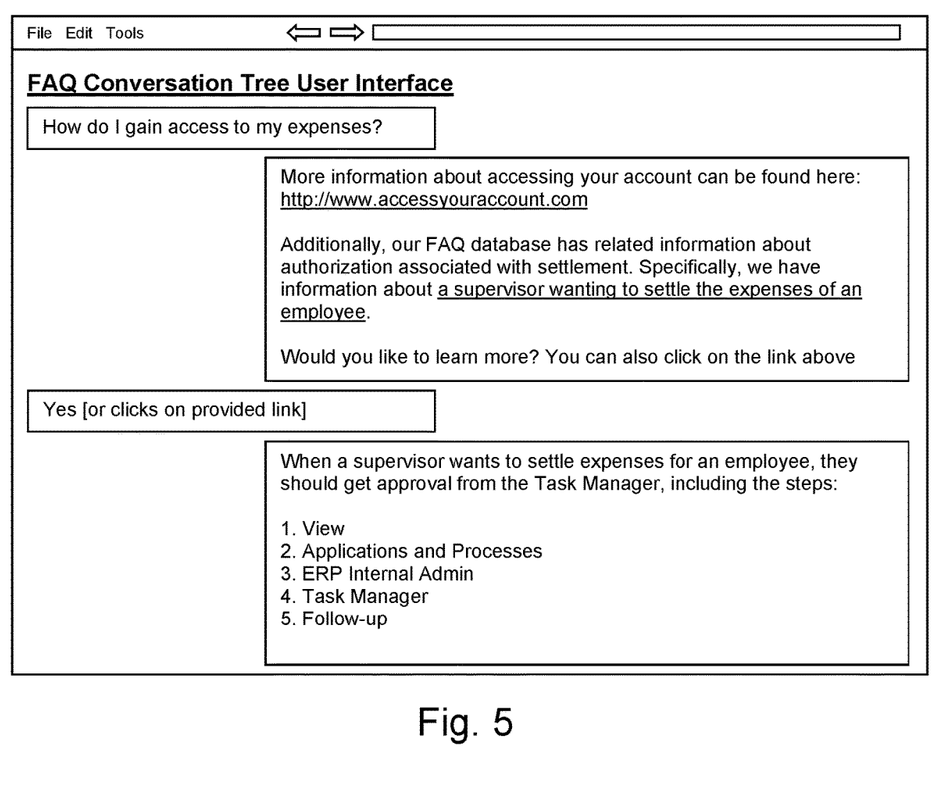
FIG. 5 is a screen shot illustrating one example configuration of the present information retrieval system.

For example, in the example user interface shown in FIG. 5, a user may request, via a chat-type format, how they gain access to their expenses. The previously described steps of transmitting the natural language query, interpreting the natural language query as a question, generating a triple from the natural language query (possibly using supplemental input from the knowledge model), and searching the FAQs and answers in the knowledge base may result in a link answering the original question of how to gain access to their expenses.

However, using the conversation tree logic described above, software running on the query generation and processing server may further determine logical next steps in the conversation. Based on the learning algorithm or heuristics disclosed above, this software may then determine that the next question asked by users relates to a supervisor wanting to settle expenses of an employee. As part of the result, therefore, the system may generate a recommended next question, possibly including a related link, as shown in FIG. 5. If the user selects this link (or otherwise responds affirmatively to the suggestion), the software on the query generation and processing server may then generate and display the appropriate answer to the user.

Figure 2:
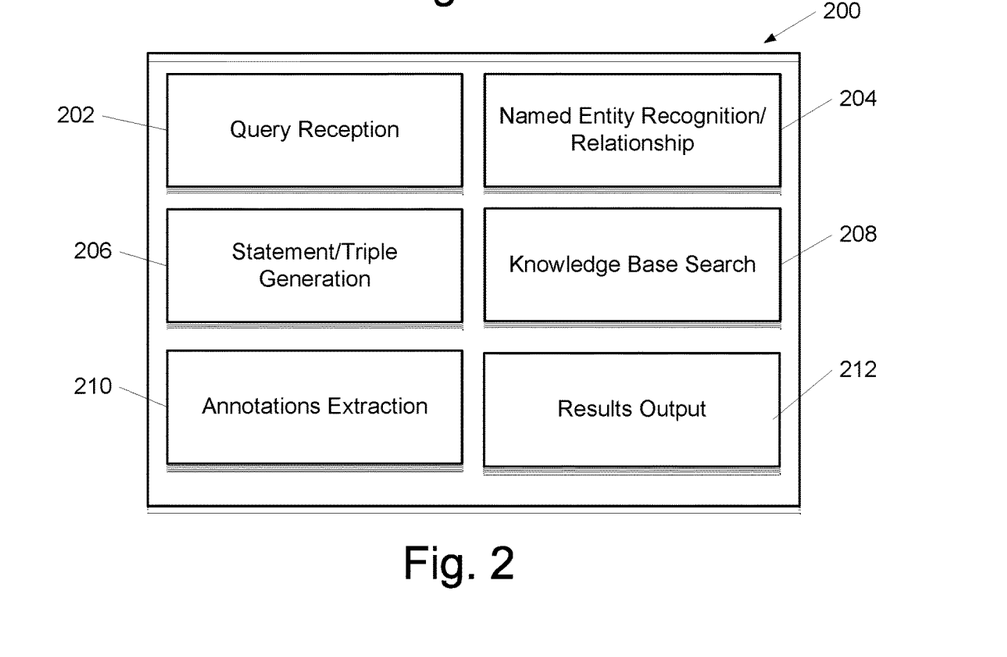
FIG. 2 is a block diagram showing functional components of the present information retrieval system.

FIG. 2 is a block diagram showing the functional components of query generation and processing server 104. Query generation and processing server 104 includes a number of modules configured to provide one or more functions associated with the present information retrieval system. Each module may be executed by the same device (e.g., computer or computer server), or may be distributed across a number of devices.

Query reception module 202 is configured to receive a natural language query targeted at a particular knowledge base and interpret the received natural language query as a question. The query may be received, for example, via a question input field within a question form displayed on client 102 of FIG. 1, and/or may be interpreted as a question using any of the methods for interpreting a query as a question disclosed herein. In various other implementations of query generation and processing server 104, though, other types of queries may be received and processed, such as natural language queries, keyword queries, structured database queries (e.g., SQL) and the like.

Named entity recognition/relationship module 204 is configured to locate, within unstructured text, atomic elements that belong to a predefined set of categories, such as the names of persons, organizations, locations, etc. (sometimes referred to as "entity identification" or "entity extraction"). For example, if named entity recognition is performed on a sentence question such as "Has Christian Bale answered questions about The Dark Knight Rises movie?" at least the named entities for "Christian Bale" and "The Dark Knight Rises" would be identified.

NER/relationship module 204 is further configured to analyze the natural language query received by query reception module 202 to identify relevant terms therein (e.g., words in the query that are also concepts, instances or relationships in the Domain Knowledge), as further discussed herein.

Statement/triple generation module 206 is configured to analyze the terms identified by NER/relationship module 204 and combine one or more pairs of the terms to generate a set of statements (triples) that describe the query in a structured manner, as further described herein.

Knowledge base search module 208 uses the query generated through query reception module 202, and processed as described above, to execute the query against the FAQs and/or answers within the desired knowledge base, and to retrieve items from the knowledge base (or links thereto) that are relevant to the query (i.e., that answer the question asked in the natural language query). After an initial set of results has been provided to the user, the knowledge base search module 208 is configured to utilize both the natural language query and a selection of ontological terms for retrieving FAQs and their answers in the knowledge base that are relevant for the words contained in the natural language question query and the specified terms.

Annotations extraction module 210 is configured to, for a set of search results identifying items in the knowledge base, retrieve the ontological terms related to those FAQs and answers (or other documents, multimedia files, etc.). Accordingly, after a natural language query including the question has been executed, generating a set of search results, annotations extraction module 210 is configured to analyze the FAQs and answers (or other documents) associated with those search results to identify terms (e.g., entities) from the relevant knowledge model that appear in those FAQs/answers or other documents.

Results output module 212 is configured to retrieve the items (or links thereto) that are relevant to an executed query (performed by knowledge base search module 208) executed against the knowledge base and provide an appropriate output to the user via client 102. In addition to the items themselves, results output module 212 may be configured to generate statistics or metrics associated with the resulting items and depict that data to the user. Results output module 212 may, for example, also depict a graph showing the relevant knowledge model entities that are present in the search results.

Figure 3:
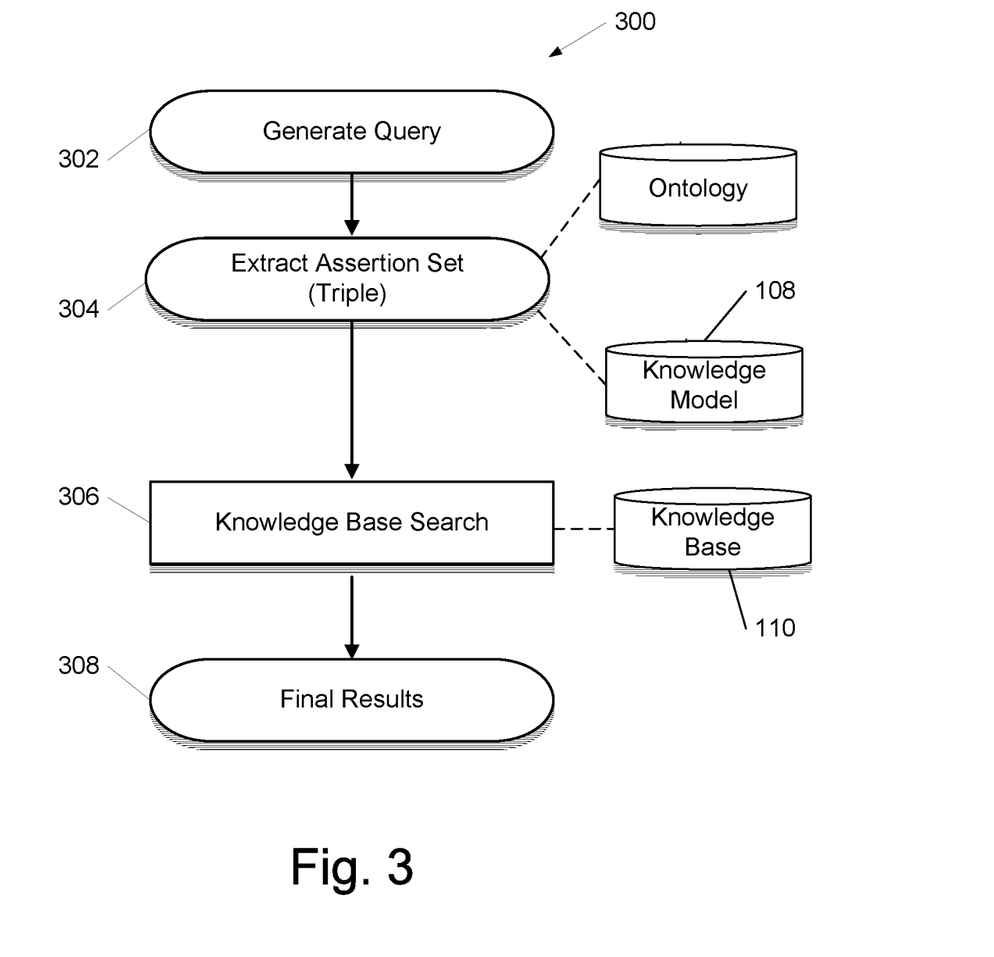
FIG. 3 is a flowchart showing method steps for querying information retrieval comprising questions and answers.

FIG. 3 is a flowchart illustrating a high-level method 300 for performing a natural language query for FAQs and/or answers annotated with triples matching the triples extracted from the question in the natural language query, in accordance with the present disclosure. This query may be generated and constructed in such a way that the triple(s) extracted from the question in the natural language query will be compared against the triples found in the annotations of each of the FAQs and/or answers stored in the knowledge base 110.

In the present system and method, a search/query is triggered by a user providing the natural language query in the form of a question, possibly via a question input field on a question form displayed on client device 102 of FIG. 1, though other means may be utilized to initiate a query. In step 302, a natural language query (i.e., a string of unstructured text) is received and generated, for example, from the client device 102 of FIG. 1. The query may be a natural language query comprising a question (as presented in a number of examples of the present disclosure) or may involve other types of queries including structured language queries, key word queries, and combinations thereof.

In step 304, a set of assertions (triples) representing the query are extracted. As seen in FIG. 3, in some embodiments, the extraction of the one or more triples from the query may be based on one or more ontologies and/or one or more knowledge models 108. The question from the natural language query is transformed into a structured query, and the triples extracted, by extracting relevant terms (using Named Entity Recognition and relationship extraction) and then combining those terms into a set of assertions (triples) that follows the ontological schema of the knowledge model, which are then used to query the knowledge base.

NER and Relationship extraction are performed on the string of text in the question making up the natural language query. This analysis, as described above, may be performed based on the knowledge model of the system (i.e., the static set of classes, instances, and possible relationships defined for the particular domain), such as defined in knowledge model 108 of FIG. 1.

After performing NER/Relationship extraction, in step 304 a set of terms will have been identified. The terms will generally include instances, concepts, or relationships that are present in the natural language query and that are also identified within the relevant knowledge model. In the present example, after analyzing the natural language query, the identified terms may include concepts, instances or even relationships.

After the query is generated and the set of assertions (triples) are extracted, in step 306 the query is executed against the knowledge base database 110. After the query is executed, the results (including, for, example, a listing of FAQs and answers from the knowledge base that satisfy the query) are displayed for the user in step 308. In step 308 the query is performed on the database of FAQs and answers in the knowledge base (e.g., knowledge base 110 of FIG. 1) to retrieve FAQs and answers (or references to items) there from that answer the question entered as a natural language query. As described above, the query can be represented, where each assertion or statement is a triple in the form (s,p,o), where 's' the subject, 'p' the predicate, and 'o' the object.

Each of the three parts of each assertion (e.g., the subject, predicate and/or object) may act as a fixed term or as a variable, depending on the nature of the term (instance, concept) and the existence of the term within the set of found terms in the natural language query, etc. The query composed by the set of assertions is applied against the knowledge base 110, which will compare the assertions in the query with those used to annotate and index the FAQs and answers contained within the knowledge base 110. The FAQs and answers in the knowledge base 110 that are annotated or indexed with terms satisfying one or more of the triples contained within the query can then be returned in a result set.

In step 308, the result set is generated based upon the results of the search query executed against the knowledge base 110. Generally, the result set includes a set of multimedia assets including the FAQs and/or answers (or other items identified as relevant in the knowledge base 110) that are relevant to the natural language query specified by the user, along with the individual concepts and instances and complete assertions associated to those assets.

As noted herein, mismatching or partially matching triples may be collected for further investigation and processing, and may be displayed to the user (along with the generated triples themselves) as part of the result set. In cases where there is only a partial match, the result(s) returned to the user may include any combination of the question or answer portion of the FAQs. In some embodiments, the result may include means for the user to rephrase or refine the question in the natural language query. Triples representing this rephrased or refined query may be extracted, optionally based on one or more ontologies and one or more knowledge models. The related triples may then be matched against one or more FAQs as previously disclosed. Any mismatching or partially matching triples may be collected for further investigation and processing.

In some embodiments, the conjunction for various triples may be modified. For example, partial satisfaction may be based on transforming the initial set of triples and replacing AND with OR in order to achieve a greater, but partial match. Also, yet another run might remove the NOT in order to achieve a greater, but partial match.

In step 308 the user determines whether the search results are satisfactory and whether those results should be further refined. If the user wishes to further refine the result set, the user may navigate through the triples or partial match editor interface elements disclosed below, including relevant terms, partial matches and/or triples displayed in step 306 and edit one or more of those terms, partial matches and/or triples to refine the search results. If such a selection is made, the selected terms, partial matches and/or triples may be run according to the edits and the knowledge base is again searched using the edited search query. After executing the refined query a new result set is displayed in step 308 and the process continues.

Figure 4:
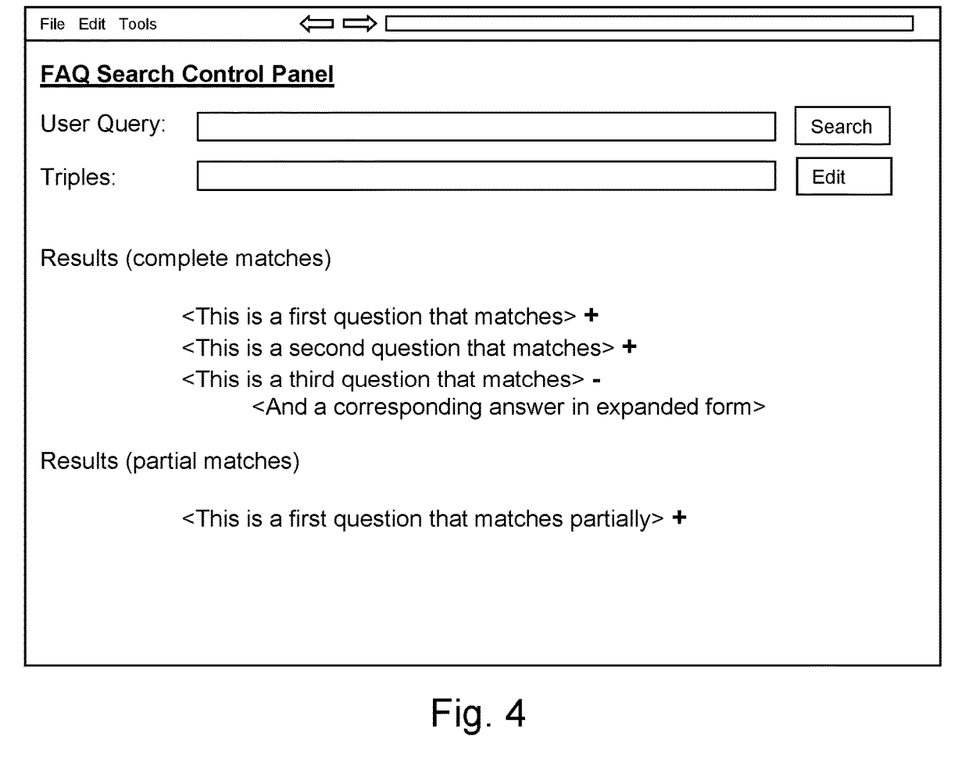
FIG. 4 is a screen shot illustrating one example configuration of the present information retrieval system.

To provide further illustration of an implementation of the present system, FIG. 4 is a portion of a screenshot showing an example user interface after the execution of an initial query. As illustrated, a user has entered a natural language query comprising a question into a question input field within a question form. The user has then activated search button, causing the question within the natural language query to be executed against a particular knowledge base. That query has generated a set of results, and in some embodiments, has generated a set of triples and/or a set of partial results requiring user modifications for additional searching. As shown in FIG. 4, each result includes the identified FAQ and answer associated with the result, as well as possible expansions for additional text describing the result item.

As seen in FIG. 4, the user interface for the disclosed system may include at least two portions, comprising a user input field ("User Query") for entering the natural language question, possibly comprising a question input field within a question form, and may further comprise a display results output area. The question input field may identify and transmit information identifying and interpreting the natural language query as a question against the FAQ entries, as previously disclosed.

The result output area displays all FAQ entries that match the query. The results output may be divided into two groups, including complete match ("Results (complete matches)") and partial match ("Results (partial matches)"). The result output area may include results that are fully displayed, or results in collapsed form, depending on the size of the results and user preference settings.

In collapsed form, the result entries may include the question portion of the FAQ with the corresponding answer being hidden behind a user interface element that allows expansion, such as the plus sign shown in the non-limiting example embodiment shown in FIG. 4, or may be a button labeled "expand' in other embodiments. By compressing the result into collapsed form, the user may view all FAQs matching the natural language query. In expanded form the answer corresponding to the FAQ is shown and an interface element allows the user to collapse it, possibly using the minus sign seen in FIG. 4, or a button labeled "collapse".

In some embodiments, such as the example seen in FIG. 4, a third section in the user interface may show the representation of the triples derived by the system. An interested user may have access to this editable user input ("Triples"), allowing the user to see if the system appropriately interpreted his natural language input and modify the triple representation in order to adjust the question.

In some embodiments, the third section and/or the partial match area may be configured to display the generated triples and/or partially matching questions and answers that depicts the entities of a knowledge model and their interrelationships. The user can use client 102 to select one or more entities from the knowledge model to filter and/or select items from the result set (which may be displayed as questions with collapsed answers). After a search is created and executed, the generated triples or partially matching results may be refined by the user to produce even more accurate results.

As a non-limiting example, the steps described above (and all methods described herein) may be performed by any central processing unit (CPU) or processor in a computer or computing system, such as a microprocessor running on a server computer, and executing instructions stored (perhaps as applications, scripts, apps, and/or other software) in computer-readable media accessible to the CPU or processor, such as a hard disk drive on a server computer, which may be communicatively coupled to a network (including the Internet). Such software may include server-side software, client-side software, browser-implemented software (e.g., a browser plugin), and other software configurations.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A system comprising a server, comprising a hardware computing device coupled to the network and including at least one processor executing instructions within a memory, which, when executed, cause the server to:
receive, from a client computer, an array of tokens;
identify, within the array of tokens:
  at least one token indicating a question; and
  a plurality of tokens common to a model stored in a data repository coupled to a network and defining:
    a plurality of entities including abstract concepts and concrete instances; and
    at least one interrelationship between the plurality of entities;
execute a query of the data repository, wherein the data repository further comprises:
  at least one answer to the question; and
  a digital information, associated in the data repository with the at least one answer, comprising the plurality of entities and the at least one interrelationship;
return a set of results comprising the at least one answer;
apply different weights, using at least one semantic similarity or distance between the array of tokens and the digital information, balancing the relationship between the question and the at least one answer;
maintain a log of partial, mismatching, or partially matching queries to identify at least one frequently asked question (FAQ) to be added to an FAQ database within the data repository; and
transmit the at least one answer to the client computer for display.

2. The system of claim 1, wherein the array of tokens is a natural language query.

3. The system of claim 1, wherein the at least one token indicating a question includes:
   at least one term, including what, when, where, why, or how;
   a question mark;
   at least one regular expression; or
   a result of an analysis performed using part-of-speech tagging.

4. The system of claim 1, wherein the model is an ontological schema for a knowledge domain storing the plurality of entities as ontological components.

5. The system of claim 1, wherein the instructions further cause the server to: locate at least one atomic element within the array of tokens that belongs to a predefined set of categories, according to an underlying ontological model.

6. The system of claim 1, wherein the data repository is a database built for storage and retrieval of semantic data in the form of triple statements.

7. The system of claim 6, wherein the triple statements include a subject, a predicate, and an object.

8. The system of claim 1, wherein the digital information comprises:
   a metadata associated with the at least one answer; or
   a content within a file including the at least one answer.

9. The system of claim 1, wherein the at least one answer is stored within: a database record; an electronic document; a spreadsheet; an email; an electronic video file; a plain text file; a marked up text file; an image; an audio file; an executable file; or a raw data file.

10. A method comprising the steps of:
    receiving, by a server, comprising a hardware computing device coupled to the network and including at least one processor executing instructions within a memory, from a client computer, an array of tokens;
    identifying, by the server, within the array of tokens:
      at least one token indicating a question; and
      a plurality of tokens common to a model stored in a data repository coupled to a network and defining:
        a plurality of entities including abstract concepts and concrete instances; and
        at least one interrelationship between the plurality of entities;
    executing, by the server, a query of the data repository, wherein the data repository further comprises:
      at least one answer to the question; and
      a digital information, associated in the data repository with the at least one answer, comprising the plurality of entities and the at least one interrelationship;
    returning, by the server, a set of results comprising the at least one answer;
    applying, by the server, different weights, using at least one semantic similarity or distance between the array of tokens and the digital information, balancing the relationship between the question and the at least one answer;
    maintaining, by the server, a log of partial, mismatching, or partially matching queries to identify at least one frequently asked question (FAQ) to be added to an FAQ database within the data repository; and
    transmitting, by the server, the at least one answer to the client computer for display.

11. The method of claim 10, wherein the array of tokens is a natural language query.

12. The method of claim 10, wherein the at least one token indicating a question includes:
    at least one term, including what, when, where, why, or how;
    a question mark;
    at least one regular expression; or
    a result of an analysis performed using part-of-speech tagging.

13. The method of claim 10, wherein the model is an ontological schema for a knowledge domain storing the plurality of entities as ontological components.

14. The method of claim 10, further comprising the step of: locating, by the server, at least one atomic element within the array of tokens that belongs to a predefined set of categories, according to an underlying ontological model.

15. The method of claim 10, wherein the data repository is a database built for storage and retrieval of semantic data in the form of triple statements.

16. The method of claim 15, wherein the triple statements include a subject, a predicate, and an object.

17. The method of claim 10, wherein the digital information comprises:
    a metadata associated with the at least one answer; or
    a content within a file including the at least one answer.

18. The method of claim 10, wherein the at least one answer is stored within: a database record; an electronic document; a spreadsheet; an email; an electronic video file; a plain text file; a marked up text file; an image; an audio file; an executable file; or a raw data file.

* * * * *